US012306754B2

United States Patent
Kotra et al.

(10) Patent No.: US 12,306,754 B2
(45) Date of Patent: May 20, 2025

(54) METHOD AND APPARATUS FOR INCREASING MEMORY LEVEL PARALLELISM BY REDUCING MISS STATUS HOLDING REGISTER ALLOCATION IN CACHES

(71) Applicant: Advanced Micro Devices, Inc., Santa Clara, CA (US)

(72) Inventors: Jagadish B. Kotra, Austin, TX (US); John Kalamatianos, Arlington, MA (US); Paul James Moyer, Fort Collins, CO (US); Nicholas Dean Lance, Windsor, CO (US); Sriram Srinivasan, Cedar Park, TX (US); Patrick James Shyvers, Fort Collins, CO (US); William Louie Walker, Fort Collins, CO (US)

(73) Assignee: Advanced Micro Devices, Inc, Santa Clara, CA (US)

(*) Notice: Subject to any disclaimer, the term of this patent is extended or adjusted under 35 U.S.C. 154(b) by 46 days.

(21) Appl. No.: 18/068,930

(22) Filed: Dec. 20, 2022

(65) Prior Publication Data

US 2024/0202116 A1 Jun. 20, 2024

(51) Int. Cl.
*G06F 12/0802* (2016.01)
(52) U.S. Cl.
CPC .. *G06F 12/0802* (2013.01); *G06F 2212/1016* (2013.01); *G06F 2212/1028* (2013.01); *G06F 2212/1044* (2013.01)

(58) Field of Classification Search
CPC ......... G06F 12/0802; G06F 2212/1016; G06F 2212/1028; G06F 2212/1044
See application file for complete search history.

(56) References Cited

U.S. PATENT DOCUMENTS

| 7,827,357 B2* | 11/2010 | Sistla | G06F 12/0831 711/119 |
| 10,073,776 B2* | 9/2018 | Srinivasan | G06F 12/084 |
| 11,467,959 B1* | 10/2022 | Yeung | G06F 12/1027 |

(Continued)

OTHER PUBLICATIONS

Bienia, Christian, et al., "The PARSEC benchmark suite: characterization and architectural implications", Proceedings of the 17th international conference on Parallel architectures and compilation techniques, Oct. 25, 2008, 10 Pages.

(Continued)

*Primary Examiner* — Gurtej Bansal
(74) *Attorney, Agent, or Firm* — FIG. 1 Patents

(57) ABSTRACT

An entry of a last level cache shadow tag array to track pending last level cache misses to private data in a previous level cache (e.g., an L2 cache), that also are misses to an exclusive last level cache (e.g., an L3 cache) and to the last level cache shadow tag array. Accordingly, last level cache miss status holding registers need not be expended to track cache misses to private data that are already being tracked by a previous level cache miss status holding register. Additionally or alternatively, up to a threshold number of last level cache pending misses to the same shared data from different processor cores are tracked in the last level cache shadow tag array, and any additional last level cache pending misses are tracked in a last level cache miss status holding register.

20 Claims, 6 Drawing Sheets

(56) References Cited

U.S. PATENT DOCUMENTS

2002/0188807 A1* 12/2002 Chaudhry ........... G06F 12/0813
              711/E12.051
2021/0165739 A1* 6/2021 Srinivasan .......... G06F 12/0817

OTHER PUBLICATIONS

Natarajan, Ragavendra, et al., "Characterizing multi-threaded applications for designing sharing-aware last-level cache replacement policies", IEEE International Symposium on Workload Characterization (IISWC) [retrieved Sep. 6, 2022]. Retrieved from the Internet <https://www.cse.iitk.ac.in/users/mainakc/pub/iiswc13.pdf>., Sep. 2013, 10 Pages.

Ould-Ahmed-Vall, Elmoustapha, et al., "Characterization of SPEC CPU2006 and SPEC OMP2001: Regression Models and their Transferability", IEEE International Symposium on Performance Analysis of Systems and software [retrieved Sep. 6, 2022]. Retrieved from the Internet <https://doi.org/10.1109/ISPASS.2008.4510750>., Apr. 2008, 12 Pages.

* cited by examiner

```
┌─────────────────────────────────┐
│   Tag Information  302          │
├─────────────────────────────────┤
│   N core bits  304              │
├─────────────────────────────────┤
│   Pending LLC Miss Indicator 306│
├─────────────────────────────────┤
│   LLC-1 MSHR ID  308            │
├─────────────────────────────────┤
│   Core ID of the LLC-1 MSHR 310 │
└─────────────────────────────────┘
```
— 300

*Fig. 3*

```
┌─────────────────────────────────┐
│   Tag Information  302          │
├─────────────────────────────────┤
│   N core bits  304              │
├─────────────────────────────────┤
│   N Pending LLC Miss Indicator 402 │
├─────────────────────────────────┤
│   LLC-1 MSHR ID  404 (1)        │
├─────────────────────────────────┤
│              •                  │
│              •                  │
│              •                  │
├─────────────────────────────────┤
│   LLC-1 MSHR ID  404 (N)        │
└─────────────────────────────────┘
```
— 400

Receive, at a current level cache a physical address corresponding to a cache miss at an immediately preceding level cache for a first processor core
702

Record the cache miss at the current level cache for the first processor core in an entry of a shadow tag array
704

*Fig. 7*

METHOD AND APPARATUS FOR INCREASING MEMORY LEVEL PARALLELISM BY REDUCING MISS STATUS HOLDING REGISTER ALLOCATION IN CACHES

GOVERNMENT LICENSE RIGHTS

This invention was made with government support under contract number H98230-21-3-0001 awarded by the Department of Defense. The government has certain rights in the invention.

BACKGROUND

Many computing devices have a memory system that includes a main memory and a cache, which is typically smaller but faster than the main memory. When a memory request is made, the device attempts to satisfy the request using the cache. If the attempt to satisfy the request using the cache fails, the device satisfies the request using the main memory.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

FIG. 3 illustrates an example shadow tag array entry that supports the increasing memory level parallelism by reducing MSHR allocation in caches discussed herein.

FIG. 4 illustrates an example shadow tag array entry that supports the increasing memory level parallelism by reducing MSHR allocation in caches discussed herein.

FIG. 7 is a flow diagram depicting a procedure in an example implementation of increasing memory level parallelism by reducing MSHR allocation in caches.

DETAILED DESCRIPTION

Overview

Figure 1:
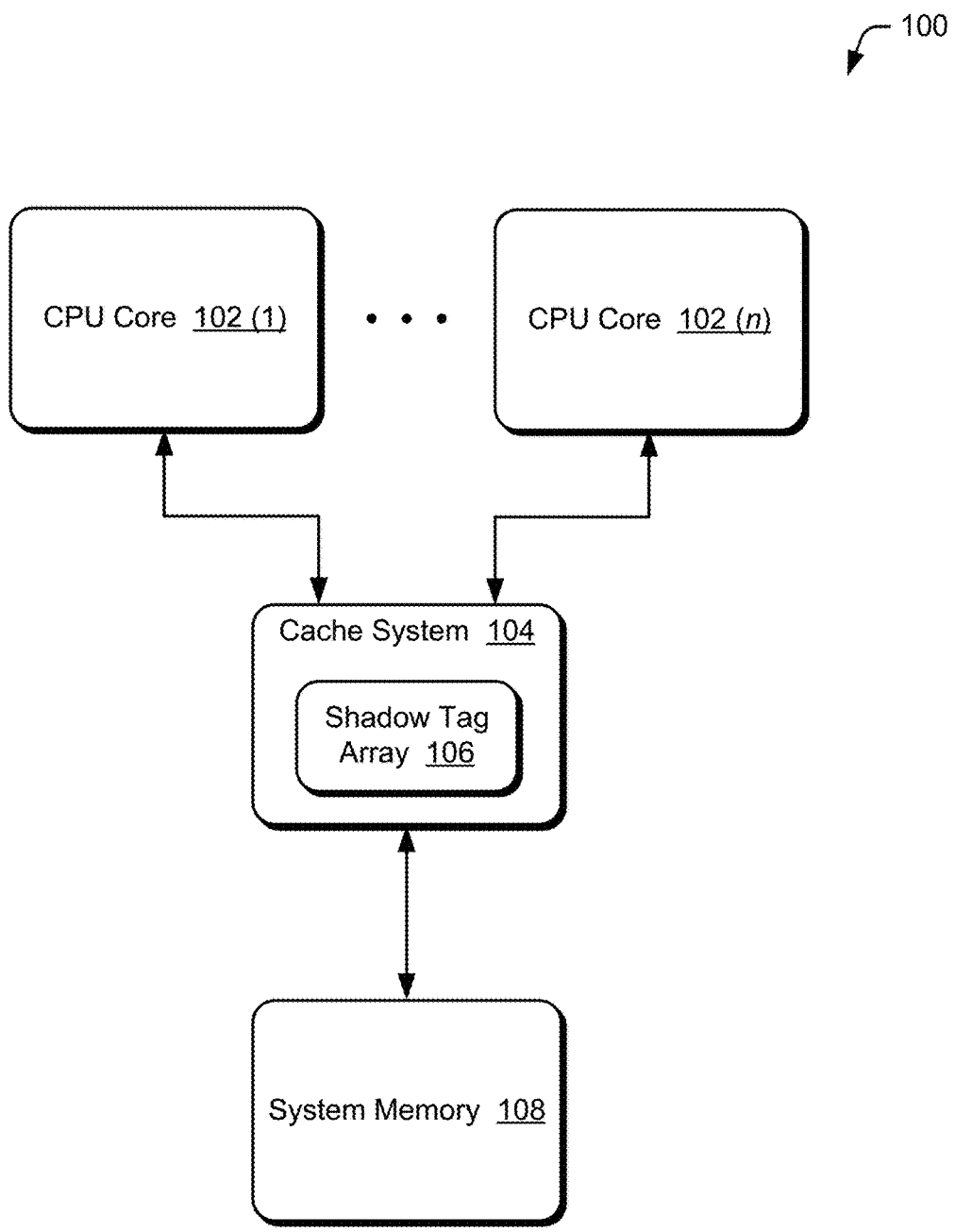
FIG. 1 is an illustration of a non-limiting example system that is operable to employ the increasing memory level parallelism by reducing miss status holding register (MSHR) allocation in caches described herein.

Many computer memory systems include a main memory and a cache, which is typically a smaller but faster memory than the main memory. Memory requests (e.g., load and store memory requests) that are satisfied by the cache typically have lower latency than memory requests satisfied by the main memory. However, not all requests are satisfied by a cache because the requested data or instruction is not available in the cache, which is referred to as a cache miss. Some applications, such as memory bound applications, oftentimes experience high last-level cache (LLC) miss rates. As the number of cores (e.g., in a core complex, such as a core complex die (CCD)) sharing the LLC rises, the LLC miss rate typically rises too. To sustain high throughput a large number of LLC miss status holding registers (MSHRs) is typically used to track the outstanding LLC misses. However, as the number of LLC MSHRs increases, so does the area usage and power usage by the LLC MSHRs on the CCD.

The techniques discussed herein make use of an LLC shadow tag array, which is typically used to determine whether particular cache lines are present in the previous level cache of any of multiple processor cores on the CCD. In one or more implementations, the techniques discussed herein repurpose an entry of the LLC shadow tag array to track pending LLC misses to private data in a previous level cache (e.g., an L2 cache), that also are misses to an exclusive LLC (e.g., an L3 cache) and to the LLC shadow tag array. Accordingly, LLC MSHRs need not be expended to track cache misses to private data that are already being tracked by a previous level cache MSHR.

In one or more implementations, LLC pending misses to shared data are tracked in the LLC shadow tag array or an LLC MSHR. In one or more implementations, each LLC shadow tag array entry is able to track a threshold number of pending shared LLC misses from different processor cores. If the current number of pending LLC misses to a physical address corresponding to the shadow tag array entry is equal to or less than that threshold number then the LLC shadow tag array entry tracks all of the pending LLC misses for the physical address. However, if the current number of pending LLC misses to a physical address corresponding to the shadow tag array entry exceeds that threshold number then an LLC MSHR is used to track at least one of the pending LLC misses for the physical address. Accordingly, an LLC MSHR need not be expended to track cache misses to shared data at a physical address unless the current number of pending misses for the shared data at the physical address exceeds a threshold number.

The techniques discussed herein allow cache systems to support a number of LLC misses that scales with the total number of previous level cache MSHRs in a core complex rather than with the total number of LLC MSHRs. This allows the cache system to sustain higher memory level parallelism as multicore systems integrate higher numbers of cores at the system level (e.g., a system on chip (SoC) level) as well as the core complex level.

Furthermore, the techniques discussed herein reduce area usage and power usage at least in part because the number of LLC MSHRs scales with the amount of shared data accesses that miss in the LLC or with the number of previous level cache MSHRs multiplied by the number of cores in the core complex. The former (shared data accesses pending in the LLC) is much lower than the total number of LLC misses typically observed by multithreaded applications. Accordingly, the LLC MSHR pool occupies less area and consumes less power or in some situations is not needed at all (due to additional metadata included in the LLC STA).

In some aspects, the techniques described herein relate to a method including: receiving, at a current level cache, a physical address corresponding to a cache miss at an immediately preceding level cache, and in response to a cache miss at the current level cache and a shadow tag array miss at the current level cache: recording the cache miss at the current level cache in the shadow tag array, and sending, to a memory system, a request for data stored at the physical address.

In some aspects, the techniques described herein relate to a method, the recording the cache miss at the current level cache in the shadow tag array including recording the cache miss at the current level cache in the shadow tag array without reserving a current level cache miss status holding register.

In some aspects, the techniques described herein relate to a method, wherein recording the cache miss includes setting a current level cache pending miss indicator in an entry of the shadow tag array.

In some aspects, the techniques described herein relate to a method, further including: receiving, from the memory system, the data stored at the physical address, marking, in an entry of the shadow tag array corresponding to the cache miss at the current level cache, that the cache miss at the current level cache is no longer pending, and returning the data to a first processor core requesting the data.

In some aspects, the techniques described herein relate to a method, further including: returning the data to a second processor core indicated in the entry of the shadow tag array.

In some aspects, the techniques described herein relate to a method, further including, in response to the cache miss at the current level cache and a shadow tag array hit at the current level cache: recording the cache miss at the current level cache in an existing entry in the shadow tag array without sending the request to the memory system.

In some aspects, the techniques described herein relate to a method, wherein the current level cache includes a level 3 cache and the immediately preceding level cache includes a level 2 cache.

In some aspects, the techniques described herein relate to a method including: receiving, at a current level cache, a physical address corresponding to a cache miss at an immediately preceding level cache for a first processor core, and in response to a cache miss at the current level cache and a shadow tag array hit at the current level cache: recording the cache miss at the current level cache for the first processor core in an entry of the shadow tag array, the entry of the shadow tag array already recording a cache miss at the current level cache for a second processor core.

In some aspects, the techniques described herein relate to a method, further including: recording, in response to available space being present in the entry of the shadow tag array, the cache miss at the current level cache for the first processor core in the entry of the shadow tag array, and tracking, in response to available space not being present in the entry of the shadow tag array, the cache miss at the current level cache for the first processor core in a shared data miss queue miss status holding register at the current cache level.

In some aspects, the techniques described herein relate to a method, further including recording the cache miss at the current level cache for the first processor core without sending a request for data stored at the physical address to a memory system.

In some aspects, the techniques described herein relate to a method, further including: receiving, from a memory system, data stored at the physical address, marking, in the entry of the shadow tag array corresponding to the cache miss at the current level cache, that the cache miss at the current level cache is no longer pending for the second processor core, and returning the data to the second processor core requesting the data.

In some aspects, the techniques described herein relate to a method, further including: marking, in the entry of the shadow tag array corresponding to the cache miss at the current level cache, that the cache miss at the current level cache is no longer pending for the first processor core, and returning the data to the first processor core requesting the data.

In some aspects, the techniques described herein relate to a method, wherein the current level cache includes a level 3 cache and the immediately preceding level cache includes a level 2 cache.

In some aspects, the techniques described herein relate to a device, including: a current level cache to receive a physical address corresponding to a cache miss at an immediately preceding level cache and send, to a memory system, a request for data stored at the physical address, and a shadow tag array to record, in response to a cache miss at the current level cache and a shadow tag array miss at the current level cache, the cache miss at the current level cache in an entry of the shadow tag array.

In some aspects, the techniques described herein relate to a device, wherein to record the cache miss at the current level cache in the shadow tag array includes recording the cache miss at the current level cache in the entry of the shadow tag array without reserving a current level cache miss status holding register.

In some aspects, the techniques described herein relate to a device, wherein to record the cache miss includes setting a current level cache pending miss indicator in the entry of the shadow tag array.

In some aspects, the techniques described herein relate to a device, wherein the current level cache is further to receive, from the memory system, the data stored at the physical address and return the data to a first processor core requesting the data, and the shadow tag array is to mark, in the entry of the shadow tag array, that the cache miss at the current level cache is no longer pending.

In some aspects, the techniques described herein relate to a device, wherein the current level cache is further to return the data to a second processor core indicated in the entry of the shadow tag array.

In some aspects, the techniques described herein relate to a device, wherein the shadow tag array is further to, in response to the cache miss at the current level cache and a shadow tag array hit at the current level cache, record the cache miss at the current level cache in an existing entry in the shadow tag array without sending the request to the memory system.

In some aspects, the techniques described herein relate to a device, wherein the current level cache includes a level 3 cache and the immediately preceding level cache includes a level 2 cache.

FIG. 1 is an illustration of a non-limiting example system 100 that is operable to employ the increasing memory level parallelism by reducing MSHR allocation in caches described herein. The system 100 includes various components including multiple (n) central processing unit (CPU) cores 102 (1), . . . , 102 (n), a cache system 104 that tracks cache missing using a shadow tag array 106, and a system memory 108. The system 100 supports virtual memory, which refers to programs running in the system 100 being allocated a range of virtual memory in a virtual memory space. The system 100 maps virtual addresses that are in the virtual memory space to physical addresses in the physical memory (e.g., system memory 108). The system 100 also transfers data stored in portions (e.g., pages) of physical memory to and from a storage device (not shown), such as a hard drive or solid-state drive, as needed, a process oftentimes referred to as paging.

The cache system 104 includes at least one cache. Each cache is memory that is typically faster than the system memory 108. Each cache is, for example, an instruction cache, a data cache, or a combination thereof (e.g., a unified cache). In one or more implementations, the system memory 108 is any of a variety of volatile memory, such as dynamic random access memory (DRAM). Additionally or alternatively, the system memory 108 is any of a variety of nonvolatile memory, such as resistive random access memory (e.g., memristors).

The system 100 is implementable in any of a variety of different types of computing devices that include or use virtual memory. For example, the system 100 is implementable in a smartphone or other wireless phone, a tablet or phablet computer, a notebook computer (e.g., netbook or ultrabook), a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IOT) device, an automotive computer, a datacenter computer, a high-performance computing (HPC) super computer, and so forth.

In one or more implementations, the CPU cores 102 (1), . . . 102 (n) and the cache system 104 are also referred to as a core complex. The core complex is typically included on a physical die referred to as a CCD. A single device (e.g., a computer or any other computing device as discussed above) includes one or more CCDs.

The cache system 104 includes any number of cache levels. In one or more implementations, the cache system 104 includes multiple L2 caches, one L2 cache corresponding to each of the CPU cores 102 (1), . . . 102 (n). The cache system 104 also includes an L3 cache that is shared by the CPU cores 102 (1), . . . 102 (n). Each CPU core 102 (1), . . . 102 (n) also includes an internal level 1 (L1) cache (not shown). Although the system 100 is discussed herein as including three cache levels (L1, L2, and L3), it is to be appreciated that the system 100 includes any number of cache levels.

The cache level in the cache system 104 immediately preceding the system memory 108 is also referred to as the LLC. In one or more implementations, the LLC is an L3 cache and an immediately preceding level cache is an L2 cache. The immediately preceding level cache is also optionally referred to as LLC-1.

In one or more implementations, each immediately preceding level cache (e.g., each L2 cache) is a private cache whereas the LLC (e.g., an L3 cache) is a shared cache. A private cache refers to a cache that is assigned to and used by a single CPU core 102. The data stored in a private cache is also referred to as private data. A shared cache refers to a cache that is assigned to and used by multiple CPU cores 102 (1), . . . 102 (n). The data stored in a shared cache is also referred to as shared data.

In one or more implementations, the LLC is an exclusive cache, which refers to a cache that stores data that is not also stored in the immediately preceding level cache.

The shadow tag array 106 is associated with the LLC and includes metadata for each of multiple cache lines stored in each of the immediately preceding level caches. The metadata for a cache line indicates which of the immediately preceding level caches stores the cache line (e.g., the immediately preceding level cache corresponding to CPU core 102 (1), the immediately preceding level cache corresponding to CPU core 102 (n), and so forth). Typically, the shadow tag array 106 is used to quickly determine whether data requested by another core in a CCD is stored in any of the immediately preceding level caches. For example, if there are eight CPU cores and eight immediately preceding level caches, the shadow tag array 106 is checked to determine whether any of the eight immediately preceding level caches stores the requested data rather than having to access each of the eight individual immediately preceding level caches. The techniques discussed herein repurpose entries of the shadow tag array 106 to track pending LLC misses to data in an immediately preceding level cache (e.g., an L2 cache), as discussed in more detail below.

In one or more implementations, on a cache miss at cache levels preceding the LLC (e.g., L1 and L2 cache misses), an MSHR at that cache level is allocated. The MSHRs are allocated to track the status of the outstanding LLC cache misses, anticipating that the data coming with the response will be stored in the LLC, and capture shared data accesses from threads of different cores to avoid sending redundant requests to the system memory 108. However, using the techniques discussed herein, an MSHR need not be allocated at the LLC in certain situations in the event of a cache miss at the LLC, as discussed in more detail below.

Figure 2:
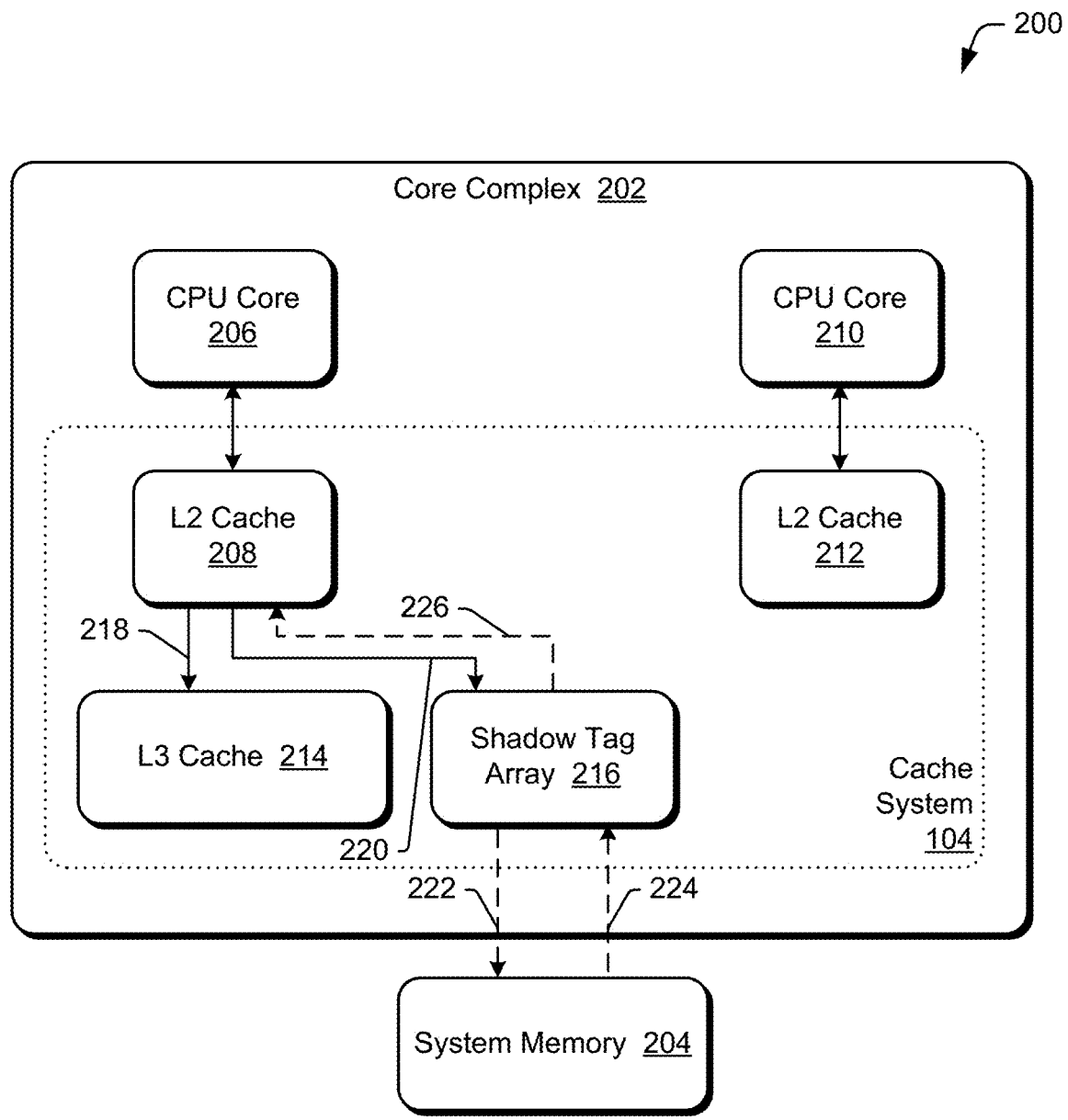
FIG. 2 is an illustration of operation of an example system implementing the increasing memory level parallelism by reducing MSHR allocation in caches discussed herein.

FIG. 2 is an illustration of operation of an example system 200 implementing the increasing memory level parallelism by reducing MSHR allocation in caches discussed herein. The system 200 includes a core complex 202 and a system memory 204. The core complex 202 includes a CPU core 206 and associated private L2 cache 208, and a CPU core 210 and associated private L2 cache 212. The core complex 202 also includes an L3 cache 214, and a shadow tag array 216 associated with the L3 cache 214. Various caches are illustrated in the core complex 202 and it is to be appreciated that these caches include, or are otherwise associated with, one or more cache controllers that control or manage the various caches. In one or more implementations, these cache controllers also control or manage the shadow tag array as well.

In the example system 200, the LLC is the L3 cache 214 and the immediately preceding level cache is the L2 cache 208. It is to be appreciated, however, that the LLC is optionally any cache level (e.g., a level 4 (L4) cache) and the immediately preceding level cache is optionally a different cache level (e.g., an L3 cache if the LLC is an L4 cache). Additionally, the system 200 is discussed with reference to cache misses for data accesses issued by the CPU core 206. It is to be appreciated that requests issued by the CPU core 210, as well as any other cores (not shown) in the core complex 202 operate analogously. Furthermore, it is to be appreciated that references to data access include actual data accessed by memory load or store requests, code or instruction requests (e.g., to load code to executed), or a combination thereof.

In one or more implementations, L3 misses to private data are serviced as follows. Upon an L2 miss in response to a data access, an L2 MSHR is reserved, a victim line is evicted from the L2 cache, and a miss indication is issued to the L3 cache 214. A check is made as to whether an L3 cache 214 miss is detected (at 218) and whether a shadow tag array 216 miss is detected (at 220). If an L3 cache 214 miss is not detected (e.g., an L3 cache 214 hit is detected), the data access is satisfied by the L3 cache 214 (e.g., the requested data is returned to the L2 cache 208 or directly to the CPU core 206). If a shadow tag array 216 miss is not detected (e.g., a shadow tag array 216 hit is detected), the requested data is stored in the private cache of another core in the core complex 202 (e.g., the CPU core 210). Accordingly, the requested data is retrieved from the private cache of the other core in the core complex 202 and returned to the L2 cache 208 or directly to the CPU core 206.

If an L3 cache 214 miss and a shadow tag array 216 miss are detected (e.g., no other core has a pending miss to the same physical address so data is currently private), then the miss is recorded in the shadow tag array 216. The miss is recorded in the shadow tag array 216 in various manners, such as by setting a corresponding L3 pending miss bit and updating the L2 MSHR tag (also referred to as an L2 MSHR identifier). The data request is also sent to the system memory 204 (at 222) without reserving an L3 MSHR. Note that since the L2 cache 208 has already been updated, the shadow tag array 216 is updated to remain in synchronization with the L2 tags. When the response arrives from the system memory 204 (at 224), the shadow tag array 216 is checked. The entry in the shadow tag array 216 indicates that an L2 MSHR has already been reserved for the data (e.g., the entry in the shadow tag array 216 indicates which L2 MSHR is tracking the pending miss at the L2 cache). Accordingly, the entry in the shadow tag array 216 tracking the miss is updated (e.g., the corresponding L3 pending miss bit is cleared or reset) to mark that the miss on the CPU core 206 is no longer pending. The requested data is forwarded (at 226) to the L2 cache 208 or the CPU core 206 that requested the data using the L2 MSHR tag or identifier included in the shadow tag array 216 entry.

It is assumed that the data remained private while the miss was serviced by the system memory 204, so no other core, from the core complex 202, tried to access the same data. In one or more implementations, the shadow tag array 216 is indexed by the physical address of the data request and the response to the data request does not carry the physical address. This is in contrast to a conventional flow using L3 MSHRs where the response carries the L2 MSHR identifier that is stored in each L3 MSHR entry. Accordingly, a mechanism is provided to link the response with the corresponding miss request tracked in the shadow tag array 216. In one or more implementations, the set and way of the shadow tag array 216 are used instead of the L2 MSHR identifier. This set and way information is known at the time an L3 miss request is sent to the system memory 204 and is carried back over with the response. It should be noted that the response does not need to carry the L2 MSHR identifier because this identifier latter is stored in the shadow tag array 216 entry.

FIG. 3 illustrates an example shadow tag array entry 300 that supports the increasing memory level parallelism by reducing MSHR allocation in caches discussed herein. The shadow tag array entry 300 includes tag information 302, core bits 304, pending LLC miss indicator 306, LLC-1 MSHR identifier 308, and a core identifier 310.

The tag information 302 indicates which cache line the shadow tag array entry 300 represents. The tag information 302 is, for example, an indication of the physical address data requested by the cache 214 miss.

The core bits 304 indicate which core's private cache (e.g., L2 cache), if any, stores the requested data. In one or more implementations, there are N bits, one bit corresponding to each CPU core in the core complex, that is set (e.g., to a value of 1) to indicate the private cache of the corresponding core stores the requested data, and cleared (e.g., to a value of 0) to indicate the private cache of the corresponding core does not store the requested data.

The pending LLC miss indicator 306 indicates that the shadow tag array entry 300 corresponds to a pending LLC miss. The shadow tag array entries typically mirror the state of the resident physical addresses in the LLC-1 caches of the core complex and act as a directory to filter external probe traffic and accelerate core-to-core transfers for cores within the core complex. The pending LLC miss indicator 306 (e.g., a single bit) differentiates shadow tag array entries tracking resident physical addresses from shadow tag array entries tracking pending misses.

The LLC-1 MSHR identifier 308 is an identifier of the LLC-1 MSHR that is tracking the pending miss at the LLC-1 cache.

The core identifier 310 is an identifier of the CPU core corresponding to the LLC-1 MSHR.

Returning to FIG. 2, in one or more implementations L3 misses to shared data are serviced as follows. An L2 miss request from the CPU core 206 takes the same actions at the L2 cache as discussed above with reference to servicing L3 misses to private data, but an L3 cache 214 miss is detected (at 218) and a shadow tag array 216 hit (e.g., a physical address match) is detected (at 220). The reason for this is that another core sharing the L3 cache 214 (e.g., CPU core 210) has registered a pending miss to this physical address. In this situation, a shadow tag array entry already exists to track the data miss and retrieval from the system memory 204. Accordingly, the shadow tag array 216 sets the pending miss bit at a position corresponding to the CPU core 206 in the residency bit vector (e.g., the core bits 304 of FIG. 3) and records the L2 MSHR tag of the new request at a slot of the STA entry corresponding to the CPU core 206. Thus, rather than having a single pending miss bit indicator (e.g., pending LLC miss indicator 306 of FIG. 3), the shadow tag array entry includes one pending miss bit indicator corresponding to each of the cores in the core complex. Similarly, rather than having a single LLC-1 MSHR identifier (e.g., LLC-1 MSHR identifier 308 of FIG. 3), the shadow tag array entry includes one LLC-1 MSHR identifier corresponding to each of the cores in the core complex, allowing the shadow tag array entry to track multiple cores in the core complex.

Once the shadow tag array entry is updated, the request is dropped and without reserving an L3 MSHR. No request need be sent to the system memory 204 as the request has already been sent (in response to the request from the CPU core 210).

When the data response comes back from the system memory 204 (in response to the request from the CPU core 210), the same actions discussed above with reference to servicing L3 misses to private data are performed to service the pending miss from the CPU core 210. Additionally, the data is also returned to the L2 cache 208 or the CPU core 206 to service the pending miss from the CPU core 206. The shadow tag array entry is updated so that both pending miss bits and their corresponding MSHR tags are cleared. In the general case, these actions will be taken to track pending misses to shared data across all cores in the core complex. The response will forward the data along with their corresponding L2 MSHR tags to all cores that have registered a miss at the STA entry.

FIG. 4 illustrates an example shadow tag array entry 400 that supports the increasing memory level parallelism by reducing MSHR allocation in caches discussed herein. The shadow tag array entry 400 includes tag information 302 and core bits 304, analogous to shadow tag array entry 300 of FIG. 3. The shadow tag array entry 400 also includes multiple (N) pending LLC miss indicators 402 and multiple (N) LLC-1 MSHR identifiers 404 (1), . . . , 404 (N). In one or more implementations, the shadow tag array entry 400 includes an LLC-1 MSHR identifier 404 for each CPU core in the core complex. Thus, each CPU core is associated with or corresponds to one LLC-1 MSHR identifier 404.

The LLC miss indicator 402 includes multiple bits each being analogous to the pending LLC miss indicator 306 of FIG. 3, and each bit indicates that the shadow tag array entry 300 corresponds to a pending LLC miss for the associated CPU core. In one or more implementations, there are N bits, one bit corresponding to each CPU core in the core complex, that is set (e.g., to a value of 1) to indicate that the shadow tag array entry 300 corresponds to a pending LLC miss for the associated CPU core.

Each LLC-1 MSHR identifier 404 is an identifier of the LLC-1 MSHR of the associated CPU core that is tracking the pending miss at the LLC-1 cache, analogous to the LLC-1 MSHR identifier 308 discussed above.

The LLC-1 MSHR tag (e.g., the LLC-1 MSHR id 404) in the same LLC STA entry is populated at the same time as the pending LLC miss indicator 402 to link the pending LLC miss tracked in the STA entry to the LLC-1 MSHR tracking the miss request at the LLC-1 cache. It should be noted that in this implementation the core identifier 310 need not be included in the shadow tag array entry because the relative position of the MSHR tag or the pending LLC miss bit uniquely identifies the core identifier in the core complex.

Additionally or alternatively, rather than having multiple pending LLC miss indicator 402 bits, the pending LLC miss indicator 402 is one bit indicating if the STA is tracking a pending LLC miss or the address is resident in the LLC-1 cache (as discussed above with reference to servicing L3 misses to private data). The N core bits 304 are instead used to track residency of addresses in the LLC-1 cache, to act as the pending miss N-bit vector when the pending miss bit per STA entry is set to 1. If the pending miss vector bit is set to 0, then the N-bit vector (the N core bits 304) tracks address residency in the N private LLC-1 caches.

Returning to FIG. 2, the amount of space used by the shadow tag array to track the L3 misses to shared data in the shadow tag array becomes vary large, due in part to the number of cores in the core complex. In one or more implementations, in order to address such space usage issues, shared data miss queue (SDMQ) MSHRs are used to assist in tracking L3 misses to shared data.

Figure 5:
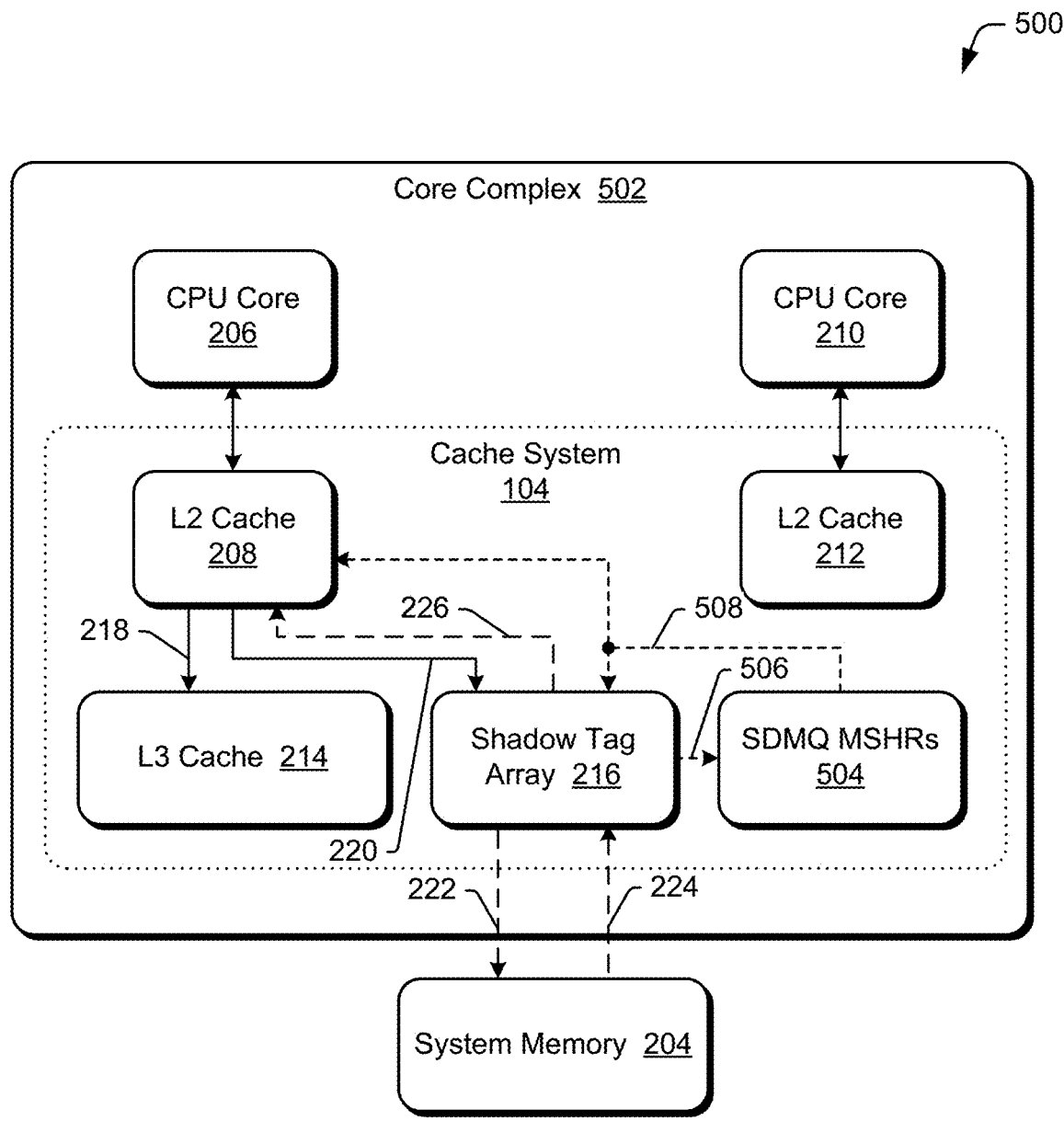
FIG. 5 is an illustration of operation of an example system implementing the increasing memory level parallelism by reducing MSHR allocation in caches discussed herein.

FIG. 5 is an illustration of operation of an example system 500 implementing the increasing memory level parallelism by reducing MSHR allocation in caches discussed herein. The system 500 includes a core complex 502 and a system memory 204, and is analogous to the system 200 of FIG. 2 except that in the system 500 the core complex 502 includes SDMQ MSHRs 504. Analogous to system 200, various caches are illustrated in the core complex 202 and it is to be appreciated that these caches include, or are otherwise associated with, one or more cache controllers that control or manage the various caches. In one or more implementations, these cache controllers also control or manage the SDMQ MSHRs as well.

In the system 500, the SDMQ MSHRs track a number of pending shared data miss requests while the shadow tag array 216 is configured to hold all private data miss requests as well as some of the shared data miss requests. This is accomplished by reducing the number of pending miss request bits (e.g., indicators 402 of FIG. 4) and LLC-1 MSHR tags (e.g., identifiers 404 of FIG. 4) tracked per shadow tag array 216 entry. A shadow tag array 216 entry tracks up to a threshold number of shared data miss requests, after which there is no available space in the entry to track additional shared data miss requests and any such additional shared data miss requests are tracked by the SDMQ MSHRs 504.

For example, if the LLC shadow tag array supports only one pending miss and its associated LLC-1 MSHR tag, then all pending misses from other cores to the same physical address are tracked in the SDMQ MSHRs 504 and not in the shadow tag array 216. If the LLC shadow tag array supports 2 pending misses to the same physical address then it holds 2 pending miss bits and 2 LLC-1 MSHR tags from 2 different cores. Any remaining shared data pending misses from other cores of the same complex are tracked in the SDMQ and not in the shadow tag array.

Private data misses are handled in the same manner as discussed above with reference to servicing L3 misses to private data, except that each L3 miss request accesses both the shadow tag array 216 (at 220) and the SDMQ MSHR 504 pool (at 506) for a physical address hit. When a shared data access is detected (L3 cache 214 miss and shadow tag array 216 hit) then the cache controller (not shown) checks if there is available space in the shadow tag array 216 entry to record the shared data miss. If there is space, then the flow is the same as described above with the shadow tag array 216 entry recording the shared data miss. However, if there is no space in the shadow tag array 216 entry then the cache controller checks for available SDMQ MSHRs (e.g., SDMQ entries) in the SDMQ MSHRs 504. If there are no available SDMQ MSHRs then the L3 miss request is stalled and waits in an L3 request queue just like an L3 miss would in a conventional LLC design. If there is an available SDMQ MSHR, then the LLC miss is tracked in the SDMQ MSHRs 504 analogous to a conventional L3 cache 214 miss.

In one or more implementations, an SDMQ MSHR 504 operates analogous to a conventional L3 MSHR except that an SDMQ MSHR 504 need only track the physical address, the core identifier, and the LLC-1 MSHR tag. The shadow tag array 216 entry also holds a bit that indicates if there are SDMQ entries to the same physical address (e.g., an SDMQ bit). The SDMQ bit is set in the case where there is no space in the shadow tag array 216 entry and an SDMQ MSHR is reserved to track the shared data miss request.

When the data response comes back from the system memory 204, the shadow tag array 216 entry is checked first. The shadow tag array 216 forwards the data to the original requestor (e.g., CPU core 206) as well as all sharers registered in the shadow tag array 216 entry. If the SDMQ bit is set then the response uses the physical address from the shadow tag array 216 entry to search the SDMQ MSHRS 504 for matches. Multiple matches are possible, depending on the number of pending miss requests to the physical address from other cores. Upon a match, the cache controller sends the LLC-1 MSHR tag stored in the matching SDMQ MSHR 504 and the data received from the system memory 204 to the corresponding LLC-1 cache of the core identifier (at 508).

It should be noted that requests filling the L3 cache 214 (such as L3 cache 214 prefetches) need not be, and typically are not, tracked in the shadow tag array 216 because the shadow tag array 216 tracks addresses (pending or resident) in the L2 caches. When there is no SDMQ MSHRs 504, there are two options: (a) use dedicated L3 MSHRs to track such miss-fill L3 cache 214 requests, or (b) track the pending L3 cache 214 misses in the L3 cache 214 tags. If solution (a) is used then for every such L3 miss request, the L3 MSHR pool is searched for a physical address hit and in case of a physical address miss, then the L3 miss request reserves a new L3 MSHR and is sent to memory. The response carries the L3 MSHR tag and is tagged with a request type that identifies it as an L3 miss request that fills the L3 (and not the L2 cache). If solution (b) is used then then the pending miss is tracked in the L3 tags and the miss request carries the L3 index/way and is tagged with the same request type as in solution (a).

Figure 6:
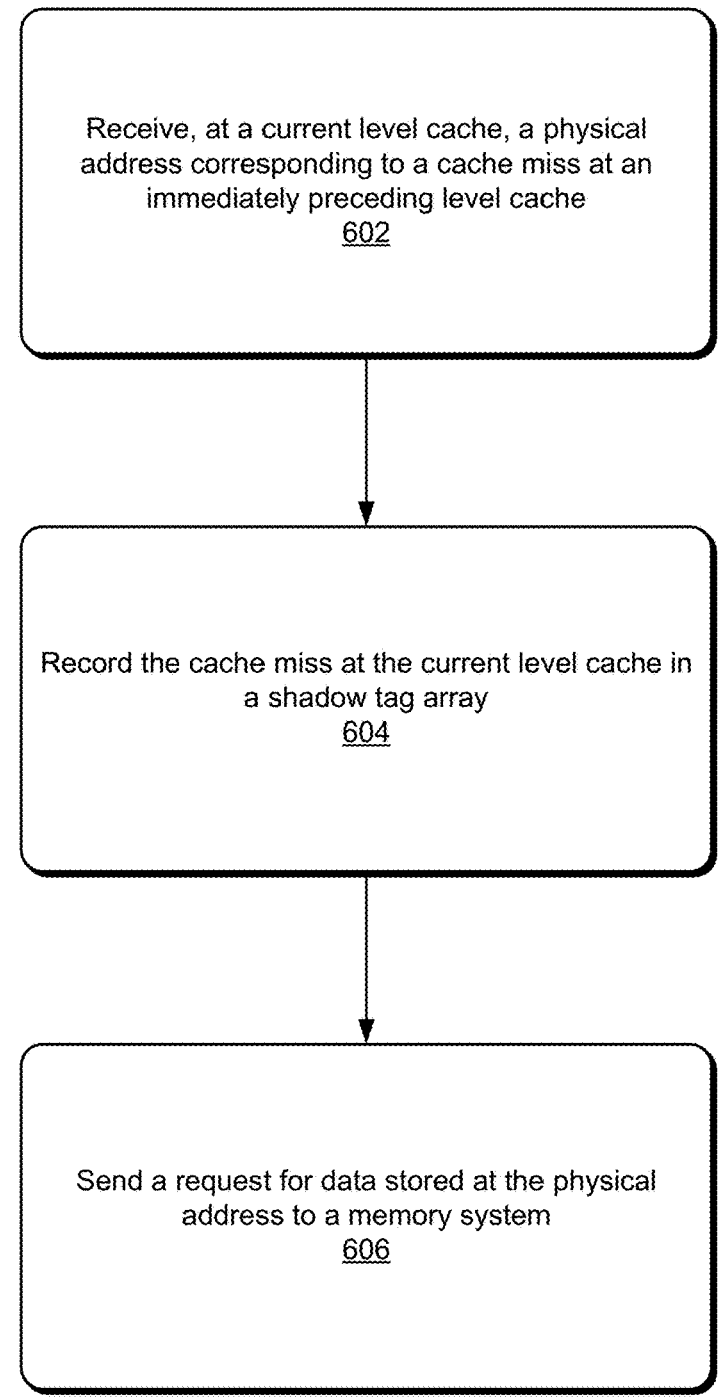
FIG. 6 is a flow diagram depicting a procedure in an example implementation of increasing memory level parallelism by reducing MSHR allocation in caches.

FIG. 6 is a flow diagram 600 depicting a procedure in an example implementation of increasing memory level parallelism by reducing MSHR allocation in caches. The flow diagram 600 is performed by a cache system, such as cache system 104 of FIG. 1, FIG. 2, or FIG. 5.

In this example, a physical address corresponding to a cache miss at an immediately preceding level cache is received at a current level cache (block 602). The current level cache is, for example, an L3 cache. The immediately preceding level cache is, for example, an L2 cache.

In response to a cache miss at the current level cache and a shadow tag array miss at the current level cache, the cache miss at the current level cache is recorded in the shadow tag array (block 604). Additionally, a request for data stored at the physical address is sent to a memory system (block 606).

FIG. 7 is a flow diagram 700 depicting a procedure in an example implementation of increasing memory level parallelism by reducing MSHR allocation in caches. The flow diagram 700 is performed by a cache system, such as cache system 104 of FIG. 1, FIG. 2, or FIG. 5.

In this example, a physical address corresponding to a cache miss at an immediately preceding level cache for a first processor core is received at a current level cache (block 702). The current level cache is, for example, an L3 cache. The immediately preceding level cache is, for example, an L2 cache.

In response to a cache miss at the current level cache and a shadow tag array hit at the current level cache, the cache miss is recorded at the current level cache for the first processor core in an entry of the shadow tag array (block 704). The entry of the shadow tag array already records a cache miss at the current level cache for a second processor core.

The various functional units illustrated in the figures and/or described herein (including, where appropriate, the CPU cores 102, the cache system 104, the system memory 108) are implemented in any of a variety of different manners such as hardware circuitry, software executing or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
receiving, at a current level cache, a physical address corresponding to a cache miss at an immediately preceding level cache, the cache miss at the immediately preceding level cache being recorded in an immediately preceding level cache miss status holding register; and
in response to a cache miss at the current level cache and a shadow tag array miss at the current level cache:
updating a tag associated with the immediately preceding level cache miss status holding register with the cache miss and the shadow tag array miss at the current level cache;
and
sending, to a memory system, a request for data stored at the physical address.

2. The method of claim 1, further comprising, in response to the cache miss at the current level cache and a shadow tag array hit at the current level cache:
recording the cache miss at the current level cache in an existing entry in the shadow tag array without sending the request to the memory system.

3. The method of claim 1, wherein the current level cache comprises a level 3 cache and the immediately preceding level cache comprises a level 2 cache.

4. The method of claim 1, further comprising:
receiving, from the memory system, the data stored at the physical address;
marking, in an entry of a shadow tag array corresponding to the cache miss and the shadow tag array miss at the current level cache, that the cache miss and the shadow tag array miss at the current level cache is no longer pending; and
returning the data to a first processor core requesting the data.

5. The method of claim 4, further comprising:
returning the data to a second processor core indicated in the entry of the shadow tag array.

6. The method of claim 1, wherein;
in response to a current number of pending misses at the current level cache not exceeding a threshold number, recording the cache miss and the shadow tag array miss at the current level cache in a shadow tag array; and
in response to the current number of pending misses at the current level cache exceeding the threshold number, recording the cache miss and the shadow tag array miss at the current level cache in a current level cache miss status holding register.

7. The method of claim 6, wherein recording the cache miss and the shadow tag array miss includes setting a current level cache pending miss indicator in an entry of the shadow tag array.

8. The method of claim 7, wherein the method further comprises clearing the current level cache pending miss indicator in the shadow tag array in response to receiving, from the memory system, the data stored at the physical address.

9. The method of claim 7, wherein the method further comprises resetting the current level cache pending miss indicator in the shadow tag array in response to receiving, from the memory system, the data stored at the physical address.

10. A device, comprising:
a current level cache to receive a physical address corresponding to a cache miss at an immediately preceding level cache and send, to a memory system, a request for data stored at the physical address, the cache miss at the immediately preceding level cache being recorded in an immediately preceding level cache miss status holding register; and
a shadow tag array to update, in response to a cache miss at the current level cache and a shadow tag array miss at the current level cache, a tag associated with the immediately preceding level cache miss status holding register with the cache miss and the shadow tag array miss at the current level cache.

11. The device of claim 10, wherein the shadow tag array is further to, in response to the cache miss at the current level cache and a shadow tag array hit at the current level cache, record the cache miss at the current level cache in an existing entry in the shadow tag array without sending the request to the memory system.

12. The device of claim 10, wherein the current level cache comprises a level 3 cache and the immediately preceding level cache comprises a level 2 cache.

13. The device of claim 10, wherein the current level cache is further configured to receive, from the memory system, the data stored at the physical address and return the data to a first processor core requesting the data, and the shadow tag array is to mark, in an entry of the shadow tag array, that the cache miss and the shadow tag array miss at the current level cache is no longer pending.

14. The device of claim 13, wherein the current level cache is further to return the data to a second processor core indicated in the entry of the shadow tag array.

15. The device of claim 10, wherein:
in response to a current number of pending misses at the current level cache not exceeding a threshold number, the shadow tag array to record the cache miss and the shadow tag array miss at the current level cache in the shadow tag array; and
in response to the current number of pending misses at the current level cache exceeding the threshold number, the shadow tag array to record the cache miss and the shadow tag array miss at the current level cache in a current level cache miss status holding register.

16. The device of claim 15, wherein to record the cache miss and the shadow tag array miss includes setting a current level cache pending miss indicator in an entry of the shadow tag array.

17. The device of claim 16, wherein the current level cache is further configured to clear the current level cache pending miss indicator in the shadow tag array in response to receiving, from the memory system, the data stored at the physical address.

18. A device comprising:
a current level cache configured to:
reserve a current level cache miss status holding register in response to a cache miss at the current level cache;
send a physical address corresponding to the cache miss at the current level cache to an immediately subsequent level cache; and
in response to a cache miss at the immediately subsequent level cache and a shadow tag array miss at the immediately subsequent level cache, update a tag associated with the current level cache miss status holding register with the cache miss at the immediately subsequent level cache and the shadow tag array miss at the immediately subsequent level cache.

19. The device of claim 18, wherein the current level cache comprises a level 2 cache and the immediately subsequent level cache comprises a level 3 cache.

20. The device of claim 18, wherein the current level cache is further configured to receive, from a memory system, data stored at the physical address and a shadow tag array is to clear the tag associated with the current level cache miss status holding register.

* * * * *